United States Patent
Sommer et al.

(10) Patent No.: US 10,894,384 B2
(45) Date of Patent: Jan. 19, 2021

(54) LAMINATE AND METHOD OF MAKING SAME

(71) Applicant: Reifenhaeuser GmbH & Co. KG Maschinenfabrik, Troisdorf (DE)

(72) Inventors: Sebastian Sommer, Troisdorf (DE); Morten Rise Hansen, Aalborg (DK); Mikael Staal Axelsen, Hjallerup (DK)

(73) Assignees: REIFENHAEUSER GMBH & CO. KG MASCHINENFABRIK, Troisdorf (DE); FIBERTEX PERSONAL CARE A/S, Aalborg (DK)

( * ) Notice: Subject to any disclaimer, the term of this patent is extended or adjusted under 35 U.S.C. 154(b) by 0 days.

(21) Appl. No.: 15/013,178

(22) Filed: Feb. 2, 2016

(65) Prior Publication Data
US 2016/0221300 A1 Aug. 4, 2016

(30) Foreign Application Priority Data

Feb. 4, 2015 (EP) .................... 15153790

(51) Int. Cl.
*B32B 5/26* (2006.01)
*B29C 70/50* (2006.01)
*B32B 37/24* (2006.01)
*B32B 37/00* (2006.01)
(Continued)

(52) U.S. Cl.
CPC ............ *B32B 5/26* (2013.01); *B29C 70/508* (2013.01); *B32B 5/022* (2013.01); *B32B 5/06* (2013.01); *B32B 5/08* (2013.01); *B32B 5/10* (2013.01); *B32B 5/12* (2013.01); *B32B 7/02* (2013.01); *D04H 1/4374* (2013.01); *D04H 3/018* (2013.01); *D04H 3/147* (2013.01); *B29K 2023/06* (2013.01); *B29K 2023/12* (2013.01);
(Continued)

(58) Field of Classification Search
None
See application file for complete search history.

(56) References Cited

U.S. PATENT DOCUMENTS 4,761,322 A * 8/1988 Raley ................ B32B 5/26
156/209
6,649,547 B1 11/2003 Arnold
(Continued)

FOREIGN PATENT DOCUMENTS

JP 07-197367 A † 8/1995
WO WO 98/29586 A1 † 7/1998

OTHER PUBLICATIONS

Handbook of Nonwovens, S.J. Russell, Woodhead Publishing, 2006, pp. 169.*
Machine translation of JPH-07-197367, Tsubata et al.*

*Primary Examiner* — Shawn Mckinnon
(74) *Attorney, Agent, or Firm* — Andrew Wilford

(57) ABSTRACT

A laminate is made by first non-crimping or low-crimping continuous filaments to form a first spunbond layer and preconsolidating the first spunbond layer with a heated or calendering roller. Then continuous filaments with a greater crimp than the continuous filaments of the first spunbond layer are deposited as a second spunbond layer over the first spunbond layer to create a two-layer structure. Finally, the two-layer structure of the first and second spunbond layers is consolidated such that a total thickness of the laminate is 0.15 to 3 mm, preferably 0.2 mm to 2.5 mm and especially 0.2 mm to 2 mm.

9 Claims, 1 Drawing Sheet

(51) Int. Cl.
  *B32B 5/02* (2006.01)
  *B32B 7/02* (2019.01)
  *D04H 3/147* (2012.01)
  *D04H 1/4374* (2012.01)
  *D04H 3/018* (2012.01)
  *B32B 5/10* (2006.01)
  *B32B 5/08* (2006.01)
  *B32B 5/06* (2006.01)
  *B32B 5/12* (2006.01)
  B29K 23/00 (2006.01)
  B29L 9/00 (2006.01)

(52) U.S. Cl.
  CPC ....... *B29L 2009/00* (2013.01); *B32B 2250/02* (2013.01); *B32B 2250/20* (2013.01); *B32B 2262/0253* (2013.01); *B32B 2262/12* (2013.01); *B32B 2262/14* (2013.01); *B32B 2305/20* (2013.01); *B32B 2307/546* (2013.01); *B32B 2307/732* (2013.01); *B32B 2555/02* (2013.01)

(56) References Cited

U.S. PATENT DOCUMENTS

| | | | |
|---|---|---|---|
| 7,005,395 | B2 | 2/2006 | Zafiroglu |
| 7,025,914 | B2 | 4/2006 | Shelley |
| 8,501,646 | B2 | 8/2013 | Motomura |
| 2002/0090499 | A1* | 7/2002 | Shelley .................. D04H 3/14  428/222 |
| 2006/0134388 | A1* | 6/2006 | Miller .................... D04H 3/14  428/174 |
| 2010/0105273 | A1* | 4/2010 | Motomura .......... A61F 13/4902  442/329 |
| 2013/0095288 | A1* | 4/2013 | Terada .................. D04H 1/541  428/137 |
| 2013/0239283 | A1* | 9/2013 | Yokoyama ............... D01F 6/06  2/9 |
| 2016/0129661 | A1* | 5/2016 | Arora ................ A61F 13/15699  428/137 |

\* cited by examiner
† cited by third party

LAMINATE AND METHOD OF MAKING SAME

FIELD OF THE INVENTION

The present invention relates to a nonwoven laminate. More particularly this invention concerns such a laminate and a method of making it.

BACKGROUND OF THE INVENTION

A laminate is known having at least two spunbond layers of continuous filaments, in particular continuous filaments of a thermoplastic polymer, in particular continuous filaments. Continuous filaments are known to differ on the basis of their more or less continuous length from staple fibers that have much shorter lengths of 10 mm to 60 mm, for example. The continuous filaments for the spunbond nonwoven layers of the laminate can be made with at least one spinning apparatus and/or with at least one spinneret.

Methods of making laminates from spunbond nonwovens are known in various embodiments in practice. For hygiene applications in particular, spunbond nonwoven laminates, i.e. spunbond nonwovens with a sufficient softness are desired. It is known that the softness of a spunbond nonwoven can be increased by using latently crimping continuous filaments. These may be, for example, bicomponent filaments with an eccentric core-sheath configuration. The softness of the spunbond nonwovens can be increased by using soft raw materials. However, there is a conflict of goals here because very soft spunbond nonwovens are at the same time also mechanically soft, i.e. mechanically less stable and cannot adequately withstand higher forces and/or tensile forces. When the spunbond nonwovens are thermally bonded to increase their strength, for example, by calendering, this is to the detriment of the softness and voluminosity of the spunbond nonwovens and results in a spunbond nonwoven that is flat and stiff. To this extent, the mechanical strength and/or tensile strength and the dimensional stability of the nonwoven compete with the softness and/or voluminosity of the spunbond nonwoven in such production methods. A satisfactory compromise is not usually achieved here with the known methods.

OBJECTS OF THE INVENTION

It is therefore an object of the present invention to provide an improved laminate.

Another object is the provision of such an improved method of making same that overcomes the above-given disadvantages, in particular where the finished product is characterized on the one hand by a great softness and voluminosity and on the other hand by an adequate stiffness and strength, i.e. tensile strength.

SUMMARY OF THE INVENTION

A laminate is made according to the invention by first depositing non-crimping or low-crimping continuous first filaments to form a first spunbond layer and preconsolidating the first spunbond layer with a heated or calendering roller. Then continuous second filaments with a greater crimp than the continuous first filaments of the first spunbond layer are deposited as a second spunbond layer over the first spunbond layer to create a two-layer structure. Finally, the two-layer structure of the first and second spunbond layers is consolidated such that a total thickness of the laminate is 0.15 to 3 mm, preferably 0.2 mm to 2.5 mm and especially 0.2 mm to 2 mm.

According to a particularly recommended embodiment of the invention, the total thickness d of the laminate is less than 1.5 mm, preferably less than 1 mm. A particularly preferred embodiment of the invention is characterized in that the total thickness d of the laminate is 0.2 mm to 1 mm, and 0.3 mm to 0.8 mm is recommended.

This total thickness d of the laminate is measured according to DIN EN ISO 9073-2 (February 1997), namely in accordance with measurement method 5.1 for normal nonwovens. A round contact area of 2500 mm$^2$ is pressed with a pressure of 0.5 kPa against the laminate sample that is in contact with a reference plate and does so without impact. Ten seconds after the initial contact of the supporting surface with the laminate, the distance between the two plates is measured as the total thickness d of the laminate.

Within the scope of the invention, the term "lower spunbond nonwoven layer" refers to a spunbond nonwoven layer of continuous filaments deposited first, i.e. earlier, and the term "upper spunbond nonwoven layer" refers to a spunbond nonwoven layer of continuous filaments deposited thereafter, i.e. later, on top of the lower spunbond nonwoven layer. It is within the context of the invention that the at least one first lower spunbond nonwoven layer and the at least one second upper spunbond nonwoven layer are made by spun bonding and/or are made as spunbond layers. To do so, the continuous filaments are each spun first from a spinning head and/or from a spinneret. The spun continuous filaments are advantageously then cooled in a cooling chamber and elongated in a stretcher. The cooling and stretching take place in a combined cooler/stretcher. It is recommended that the stretching of the continuous filaments be done aerodynamically. It is within the context of the invention for the two-layer structure of the cooling chamber and the stretching unit and/or the combined cooling and stretching unit to be formed as a closed system—apart from the air supply in the cooler. This means that in this unit, in addition to the above-described air supply, no further air supply takes place in the cooling chamber and/or in the cooling unit. This embodiment of the closed system has proven particularly successful for the production of a laminate according to the invention. According to a preferred embodiment of the invention, the cooled and stretched continuous filaments are passed through at least one diffuser for each of the two spunbond nonwoven layers and then are deposited on a support, in particular on a supporting screen belt thereafter. The continuous filaments for the first lower spunbond nonwoven layer are advantageously deposited on the support and/or on the support screen belt and then the continuous filaments for the second upper spunbond nonwoven layer are deposited. Basically, the continuous filaments for the second upper spunbond nonwoven layer could also be deposited first on the support and/or on the support screen belt and then the continuous filaments of the first lower spunbond nonwoven layer are deposited on the support and/or on the support screen belt. It is also within the scope of the present invention for at least one layer of meltblown fibers to be arranged between the spunbond nonwoven layers (and/or spun bond layers). It is also within the scope of the invention for the at least one meltblown layer to have non-crimping meltblown fibers.

According to the invention the at least one first lower spunbond layer is compacted and/or preconsolidated with at least one heated roller and/or calendering roller. Therefore, the first lower spunbond layer is also compacted and/or consolidated to a certain extent. The intent here is for the first lower spunbond layer to be formed as a relatively compact, stiff layer having greater tensile strength than the upper spunbond layer. The first lower spunbond layer should advantageously determine the strength of the entire laminate. According to one embodiment of the invention, the thickness of the at least one lower spunbond layer is less than the thickness of the at least one second upper spunbond layer arranged above it. It is within the scope of the invention for the density of the at least one lower spunbond layer to be higher or much higher than the density of the at least one second upper spunbond layer above it. To achieve an adequate overall stability and/or an adequate cohesion of the laminate, the at least two spunbond layers are consolidated. A preconsolidation and a final consolidation may take place here or there may only be the final consolidation of the two-layer structure.

The laminate made by the method according to the invention is characterized first by a satisfactory stability, i.e. dimensional stability, in particular in the machine direction. The laminate is adequately compact on the whole and has an adequate stiffness. At the same time the laminate is characterized by a relatively great softness and voluminosity. The stability and stiffness are ensured primarily by the first lower spunbond layer, and the softness and/or voluminosity are ensured by the second upper spunbond layer. The laminate also has a good grip and a comparatively low density.

It is within the scope of the invention that monocomponent filaments and/or multicomponent filaments and/or bicomponent filaments having a symmetrical and/or coaxial configuration (cross-sectional configuration) are used for the first lower spunbond layer. Multicomponent filaments and/or bicomponent filaments with coaxial or symmetrical core-sheath configuration are especially preferably used. Basically, however, other symmetrical cross-sectional configurations may also be used, for example, trilobal configurations and the like. Advantageously at least 85% by weight, preferably at least 90% by weight, especially at least 95% by weight and very preferably at least 98% by weight of the continuous filaments of the first lower spunbond layer consist of monocomponent filaments and/or the multicomponent filaments and/or bicomponent filaments with a symmetrical cross-sectional configuration described above.

It is recommended that the continuous filaments of the first lower spunbond layer consist of at least one polyolefin and/or essentially at least one polyolefin. The continuous filaments of the first lower spunbond layer are preferably made of polypropylene and/or polyethylene and/or essentially polypropylene and/or polyethylene. If monocomponent filaments are used for the first lower spunbond layer, these advantageously consist of polypropylene and/or essentially polypropylene. When using bicomponent filaments and/or multicomponent filaments for the continuous filaments of the first lower spunbond layer, at least one component of these continuous filaments consists of at least one polyolefin, preferably polypropylene and/or polyethylene. A preferred embodiment of the method according to the invention is characterized in that continuous filaments and/or multicomponent filaments/bicomponent filaments with a coaxial core-sheath configuration are used for the first lower spunbond layer. The core is advantageously made of polypropylene and the sheath is preferably made of polyethylene. The weight ratio of the core to the sheath and/or of the polypropylene to the polyethylene is 50:50 to 80:20 according to recommendations, preferably 70:30. The invention is otherwise based on the discovery that a higher polypropylene content in the core is very helpful or even essential for the stability of the laminate according to the invention.

An embodiment of the invention that is particularly recommended is characterized in that continuous filaments with a natural crimp and/or with a latent crimp tendency are used as the continuous filaments for the second upper spunbond layer. The second upper spunbond layer advantageously consists of at least 85% by weight, preferably at least 90% by weight, especially at least 95% by weight and especially preferably at least 98% by weight continuous filaments with a natural crimp and/or with a latent crimp. It is within the scope of the invention for an inherent crimp tendency to be induced in these continuous filaments through the choice of raw materials and process settings.

According to a particularly preferred embodiment of the invention, multicomponent filaments and/or bicomponent filaments with a side-by-side configuration are used as the continuous filaments for the second upper spunbond layer. According to another embodiment, multicomponent filaments and/or bicomponent filaments with an eccentric and/or asymmetrical cross-sectional configuration are used, in particular those with an eccentric and/or asymmetrical core-sheath configuration. The continuous filaments for the second upper spunbond layer preferably consist of at least 85% by weight, advantageously at least 90% by weight, preferably at least 95% by weight and very preferably at least 98% by weight of such filaments and/or multicomponent filaments with a side-by-side configuration and/or an eccentric cross-sectional configuration.

A preferred embodiment of the invention is characterized in that at least one component of the multicomponent filaments and/or bicomponent filaments for the second spunbond layer consists of at least one polyolefin and/or essentially at least one polyolefin. Advantageously all the components of the multicomponent filaments and/or bicomponent filaments consist of at least one polyolefin and/or essentially at least one polyolefin. Basically, however, other raw materials, in particular polyamide or a polyethylene terephthalate are possible for these components. The polyolefins are in particular polypropylene and/or polyethylene. According to one embodiment of the invention, bicomponent filaments in a side-by-side configuration are provided for the second upper spunbond layer, wherein one component consists of polypropylene, while the other component consists of polyethylene, wherein the ratio of polypropylene to polyethylene is 40:60 to 60:40.

According to another preferred embodiment of the invention, multicomponent filaments and/or bicomponent filaments of at least two different polypropylenes are used as the continuous filaments having a latent crimp tendency for the second upper spunbond layer. "Different polypropylenes" here and below refers in particular to polypropylenes having different molecular weight distributions and/or different viscosities and/or different isotacticities. Preferably polypropylene homopolymers and/or polypropylene copolymers are used as the polypropylenes. According to a recommended embodiment of the invention, bicomponents filaments in a side-by-side configuration are used for the continuous filaments of the second spunbond layer and the two components of the bicomponent filaments here consist of different polypropylenes. According to another preferred embodiment of the invention, multicomponent filaments and/or bicomponent filaments with an asymmetrical cross-sectional configuration are used for the continuous filaments of the second upper spunbond layer, and these multicomponent filaments and/or bicomponent filaments have different polypropylenes for the individual components.

One embodiment of the invention is characterized in that the second upper spunbond layer is compacted and/or preconsolidated with the help of hot air. In particular at least one hot-air blade that acts upon the second upper spunbond layer preferably from above can be used here. According to another embodiment of the method according to the invention, the second upper spunbond layer is compacted and/or preconsolidated by at least one hot roller (hot discharge roller). According to a recommended embodiment of the method according to the invention, the temperature of the first hot roller for compacting and/or preconsolidating the first lower spunbond layer is higher than the temperature of the second hot roller for compacting and/or preconsolidating the second upper spunbond layer. As an alternative to the temperature difference in the hot rollers and most especially preferably in addition to the temperature differential mentioned above, the contact pressure of the first hot roller for compacting and/or preconsolidation of the first lower spunbond layer is most especially preferably higher than the contact pressure of the second hot roller for compacting and/or preconsolidating the second upper spunbond layer in addition to the temperature differential described above. One embodiment of the method according to the invention is characterized in that the temperature of the first hot roller for compacting and/or preconsolidation of the first lower spunbond layer amounts to 100 to 130° C., and the temperature of the second hot roller for compacting and/or preconsolidation of the second upper spunbond layer amounts to 70 to 100° C. It is within the scope of the invention for the temperatures to increase with throughput speed.

Furthermore, it is within the scope of the invention that the two-layer structure of the first lower spunbond layer and the second upper spunbond layer and/or the layer two-layer structure for the laminate is/are subjected to the final consolidation, preferably by at least one calender. Basically, a final hot air consolidation of the laminate may also be performed. According to one embodiment of the method according to the invention, a low-melting thermoplastic polymer—in particular a low melting polyethylene—is present as a component in both spunbond layers. A very effective final consolidation of the laminate can be achieved in this way.

It is recommended that the method according to the invention and/or the compacting and/or the preconsolidation and/or the consolidation steps within the context of the method according to the invention be carried out such that the thickness $d_1$ of the first lower spunbond layer in the laminate is 0.05 to 0.6 mm, preferably 0.1 to 0.3 mm and very preferably 0.15 to 0.2 mm and/or the thickness $d_2$ of the second upper spunbond layer in the laminate is 0.15 to 2.8 mm, preferably 0.2 to 2.5 mm and very preferably 0.2 to 0.95 mm. The individual thicknesses $d_1$ and $d_2$ of the spunbond layers in the laminate are measured according to the preferred embodiment as described below. First as described further above, the total thickness of the laminate is measure according to DIN EN ISO 9073-2 (February 1997). Then the laminate is compressed by adjustable surfaces to define the total thickness of the laminate thus measured. The volume of the nonwoven created in this way is advantageously filled by a preferably transparent casting resin and then the resin is cured. Then the thicknesses of the individual layers can be measured on the laminate stabilized in this way. To do so, for example, after one cut across the surface of the laminate, the individual thicknesses of the layers can be measured optically. The individual borderline surfaces and their heights in the laminate can also be determined in particular in the head-on view of the laminate by scanning microscopy in particular.

A particularly preferred embodiment of the invention is characterized in that the spunbond layers of the laminate according to the invention are created and/or deposited such that the continuous filaments of the first lower spunbond layer are oriented more in the machine direction (MD) than the continuous filaments of the second upper spunbond layer. To this extent the first lower spunbond layer has a greater stiffness in the machine direction than the second upper spunbond layer of the laminate. The first lower spunbond layer is a more compact, stiffer and denser spunbond layer than the second upper spunbond layer. The first lower spunbond layer advantageously determines the stability of the product as a whole.

A highly recommended embodiment of the method according to the invention is characterized in that the longitudinal stiffness $S_L$ of the finished laminate comprised of the at least one first spunbond layer and the at least one second spunbond layer is 20 to 80%, preferably 40 to 65% of the longitudinal stiffness $S_V$ of a comparative nonwoven and/or a comparative laminate. The comparative nonwoven and/or the comparative laminate here is made of the same material as the at least one first spunbond layer of the laminate, and the comparative nonwoven and/or the comparative laminate has the same weight per unit of area as the laminate. In addition, the comparative nonwoven and/or the comparative laminate is/are made with the same equipment as the laminate and under the same conditions as the laminate. It is within the scope of the invention for the comparative nonwoven and/or the comparative laminate to have the same number of layers and/or spunbond layers as the laminate and for all the layers and/or spunbond layers of the comparative nonwoven and/or the comparative laminate to be made under the same conditions as the first spunbond layer of the laminate. In particular the preconsolidation and/or consolidation take place in the same way as the preconsolidation and/or consolidation of the first spunbond layer of the laminate. Thus, for example, in the case of a preconsolidation of the first spunbond layer of the laminate by a calender with 5 to 22% welding surface, the comparative nonwoven and/or comparative laminate is preconsolidated and/or consolidated by this calender with 5 to 22% welding area.

The longitudinal stiffness $S_L$ of the (finished) laminate and the longitudinal stiffness $S_V$ of the comparative laminate and/or the comparative nonwoven are determined in particular from the stress-stretch curve as the force at 5% stretch of the laminate and/or of the comparative nonwoven/comparative laminate, where the longitudinal stiffness is preferably standardized to the weight of the laminate or of the comparative nonwoven/comparative laminate per unit of area so that the unit of longitudinal stiffness (N/5 cm)/(g/m$^2$). It is within the scope of the invention that the longitudinal stiffness and/or the stress-stretch curve is measured according to EDANA 20.2-89. In addition, it is within the scope of the invention that a nonwoven sample and/or a laminate sample with a width of 50 mm between two clamping devices is clamped with a distance of 100 mm so that the length of the sample tested/measured is 100 mm. Next, this nonwoven sample and/or laminate sample is stretched by a stretching machine at a rate of advance of 100 mm/min up to a preliminary force of 0.5 N. In this condition, the measurement is then set back at zero and the actual measurement begins. The tensile machine operates with a rate of advance and/or at a tensile rate of 200 mm/min. As already explained above, the longitudinal stiffness is therefore determined from the stress-stretch curve as the force at 5% stretch of the sample. According to one embodiment of the method according to the invention, the production of the at least two spunbond layers can take place in an inline process. According to one other embodiment, an offline production of the spunbond layers is also possible. Thus, for example, at first only the at least one first lower spunbond layer can be made and then at another point in time and/or at a different location the at least one upper spunbond layer is then deposited on the at least one first lower spunbond layer. The laminate made up of the at least two spunbond layers is then consolidated. There is therefore both inline production and offline production of the laminate within the context of the method according to the invention.

To attain the object, the invention also teaches a laminate having at least two spunbond layers of continuous filaments, in particular continuous filaments made of a thermoplastic polymer, where at least one first lower spunbond layer consists and/or essentially consists of non-crimping continuous filaments and/or of low-crimping continuous filaments, and at least one second upper spunbond layer consists and/or essentially consists of crimping continuous filaments and/or of continuous filaments having a greater crimping tendency than the continuous filaments of the first lower spunbond layer, a total thickness d of the laminate being 0.15 to 3 mm, preferably 0.2 to 2.5 mm and especially 0.2 to 2 mm and a weight of the total laminate per unit of area is 8 to 80 g/m$^2$, preferably 10 to 40 g/m$^2$ and especially 12 to 30 g/m$^2$. It is within the scope of the invention for the crimp of the spunbond layers in the laminate to increase from either the bottom or the top. To this extent, it is also within the scope of the invention for the crimp of the spunbond layers in the laminate to increase from bottom to top and from non-latently crimping to latently crimping. Furthermore, it is within the scope of the invention for the density of the spunbond layers in the laminate to decrease from the bottom to top. According to one embodiment of the invention, the thickness of the spunbond layers in the laminate increases from bottom top. Basically, however, the thicknesses may also be identical and/or similar or the thickness of the spunbond layers in the laminate may also decrease from bottom to top. According to a highly recommended embodiment, at any rate the density of the spunbond layers in the laminate decreases from bottom to top. A preferred embodiment of the invention is characterized in that the thickness ratio of the thickness $d_1$ of the first lower spunbond layer to the thickness $d_2$ of the second upper spunbond layer amounts to 1:0.8 to 6:0 and preferably 1:2 to 1:4. Thus according to one embodiment of the invention the thickness $d_2$ of the at least one second upper spunbond layer is two to four times greater than the thickness $d_1$ of the at least one first lower spunbond layer.

It is advisable for the continuous filaments of the first lower spunbond layer to have a titer of 1.0 to 2.5 den, preferably from 1.2 to 2 den. It is recommended that the continuous filaments of the second upper spunbond layer should have a titer of 1.2 to 4 den, preferably from 1.8 to 2.5 den. A particularly recommended embodiment is characterized in that the titer of the second upper spunbond layer is less than 2.2 den. It is within the scope of the invention for the filament diameter of the continuous filaments of the at least one first lower spunbond layer to be lower than the filament diameter of the continuous filaments of the at least one second upper spunbond layer. The titer of the spunbond layer in the laminate therefore increases from bottom to top.

The invention is based on the discovery that a laminate that is characterized first by a high stability and/or dimensional stability—in particular in the machine direction—and second is characterized by a relatively great softness and/or voluminosity can be made easily by the method according to the invention. To this extent an optimal compromise is achieved between stability/strength on the one hand and softness/voluminosity on the other hand. Furthermore, the invention is based on the discovery that the at least one first lower spunbond layer adequately ensures the stiffness—in particular in the machine direction of the laminate. The laminate according to the invention is sufficiently compact, has a good hand and is also characterized by a relatively low total density. In addition, it should be emphasized that the laminate according to the invention can be made by a relatively simple and uncomplicated method, and to this extent, is also characterized by a relatively low cost. The laminate according to the invention can be used in particular for hygiene applications, for example, for diapers and the like. Basically, however, other possible applications are also conceivable.

The invention is explained in greater detail below on the basis of an illustrated embodiment. A laminate according to the invention is made from two spunbond layers made of polypropylene by a double-bar system. Both spunbond layers are created by the spun bonding method. The two spunbond layers are advantageously each made according to the Reicofil method in which the filaments spun for a spunbond layer are first guided through a cooling chamber where they are cooled with cold air and are then introduced into a stretching unit for aerodynamic stretching. In the production of each spunbond layer, here and in the illustrated embodiment, it is expedient to work with a combined cooling and drying unit that is designed as a closed system. This means that in this cooling and stretching unit, apart from the supply of air in the cooling chamber, there is no further supply of air from the outside. After the filaments of each layer have passed through the stretching unit, they are passed through a diffuser and, after that, are deposited on a depositing screen belt for the spunbond layer.

To create the first lower spunbond layer, monocomponent filaments made of polypropylene are spun. These are homo-polypropylene (*Borealis* HG455FB) with a melt flow rate of 25 g/10 min (measured according to ISO 1133, 230° C./2.16 kg force). The spun filaments have a titer of 1.8 denier and the first spunbond layer deposited on the depositing screen belt is compacted and/or preconsolidated with a heated roller as a preconsolidation roller at a roller temperature of 120° C.

The second upper spunbond layer for the laminate is created from crimping and/or self-crimping filaments in contrast with the first spunbond layer. The filaments for this second upper spunbond layer are spun as bicomponent filaments in a side-by-side configuration. In this process, the first side in the illustrated embodiment is made of the homo-polypropylene of the first spunbond layer (for data, see above). The second side of the bicomponent filaments consists of a mixture of two polypropylenes that are blended in a weight ratio of 50:50. The first polypropylene for this mixture is again the homo-polypropylene of the first spunbond layer (for data, see above) and the second polypropylene for the second side of the bicomponent filament is a homopolypropylene with a broader molecular weight distribution (Moplen HP552R), wherein this polypropylene also has a melt flow rate of 25 g/10 min (measured according to ISO 1133, 230° C./2.16 kg force). The weight ratio of the first side (homo-polypropylene of the first spunbond layer) to the second side (mixture of the above-described polypropylenes) of the bicomponent filaments amounts to 80:20 in the first illustrated embodiment. For the second upper spunbond layer, bicomponent filaments having a titer of 1.9 denier are spun. The bicomponent filaments are deposited as the second upper spunbond layer on the first lower spunbond layer on which the deposited screen belt lies. This is followed by compacting and/or preconsolidation using a heated roller and/or preconsolidation roller at a roller temperature of 90° C.

Finally the laminate comprised of the two spunbond layers is consolidated with a heated calender. The calender has an engraved surface of 18% and an engraving of 50 elliptical points/cm². The calender temperature (surface) is 138° C. and the contact pressure (line load) is) 45 N/mm. It operates at a system speed of 235 m/min. The weight of the finished laminate per unit of area is 22 g/m² and the weight percentage of the first spunbond layer in the finished laminate is 52% (first spunbond layer: 11.5 g/m²; second spunbond layer: 10.5 g/m²). The finished laminate is 0.38 mm thick. For the longitudinal stiffness $S_L$ of the finished laminate this yields a tensile force of 6.8 N/5 cm for 5% stretch of the laminate.

A comparative nonwoven and/or a comparative laminate is/are made from two spunbond layers, both of which consist of the homo-polypropylene of the first spunbond layer of the laminate described above. This comparative laminate is made under the same conditions as the laminate according to the invention described above (same system speed, calender temperature, titer, respective weight per unit of area of each layer, etc.). The comparative laminate has a thickness of 0.27 mm and a tensile force of 10.8 N/5 cm is measured at 5% stretch of the comparative laminate. The ratio of tensile forces in the case of the laminate according to the invention, on the one hand, and the comparative laminate, on the other hand, is 0.63 at 5% stretch.

According to a recommended embodiment of the invention, monocomponents of a polymer and/or of a polypropylene with a relatively narrow molecular weight distribution are used for the at least one first lower spunbond layer. The melt flow rate of this polymer and/or of this polypropylene is preferably 19 to 40 g/10 min. The melt flow rates given here are also all measured according to ISO 1133, 230° C./2.16 kg force.

It is within the scope of the invention for the at least one second upper spunbond layer for bicomponent filaments with a side-by-side configuration to be used for the at least one second upper spunbond layer. A polymer and/or a polypropylene according to the monocomponent filaments of the first lower spunbond layer described above is/are advantageously used for one side of these bicomponent filaments. A polymer and/or polypropylene with a broader molecular weight distribution is/are preferably used for the second side of the bicomponent filaments. According to one recommended embodiment, the polymer and/or the polypropylene of the second side has/have a melt flow rate between 15 and 40 g/10 min. According to one embodiment, blends of polymers and/or of polypropylenes and/or of two polypropylenes are used for the second side. The polypropylenes preferably used for this purpose may be monomodal or bimodal polypropylenes or copolymers of these polypropylenes. The mixing ratio is, for example, 50:50. The components of the polymer blends and/or polypropylene blends for the second side of the bicomponent filaments advantageously melt flow rates between 3 and 60 g/10 min. The weight ratio of the two sides of the bicomponent filaments is preferably 6:40 to 90:10, preferably 65:35 to 80:20. It is recommended that the ratio of the melt flow rates of the polymers and/or polypropylenes of both sides of the bicomponent filaments is 0.65 to 1.5.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
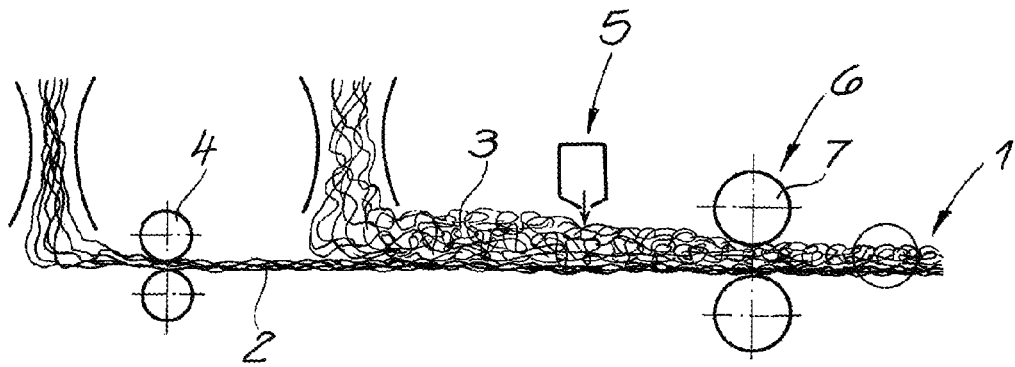
FIG. 1 is a section through a first embodiment of a device for carrying out the method according to the invention of making a laminate according to the invention in a side view.
Figure 1A:
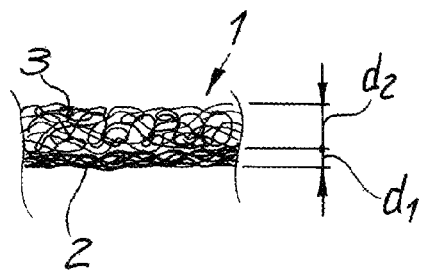
FIG. 1A is a large-scale view of a detail of FIG. 1.

As seen in the drawing, a laminate 1 has a plurality of spunbond layers 2 and 3 made from continuous filaments. The laminate here preferably consists of two spunbond layers 2 and 3. The continuous filaments are advantageously made of a thermoplastic polymer in the embodiment.

In the embodiment according to FIGS. 1, 1A, 2, and 2A, non-crimping and/or low-crimping continuous filaments are preferably deposited to form the first spunbond layer 2. These continuous filaments preferably have a coaxial and/or symmetrical core-sheath configuration and/or cross-sectional configuration in the embodiment. The core is advantageously made of polypropylene and the sheath is preferably made of polyethylene here, and the weight ratio of polypropylene to polyethylene is preferably 70:30 in this embodiment. The higher amount of polypropylene in the core here contributes to the stability and/or strength of the first spunbond layer 2. In the embodiment according to FIGS. 1 and 2, it is recommended that the first lower spunbond layer 2 then be compacted and/or preconsolidated with the help of a heated roller 4. This first heated roller 4 may have a temperature of 120° C. in the embodiment.

After this compacting and/or preconsolidation, high-crimping continuous filaments are deposited over the first spunbond layer 2 to form the second upper spunbond layer 3 and/or than the continuous filaments of the first lower spunbond layer 2, more strongly crimping continuous filaments are deposited there. These continuous filaments for the second upper spunbond layer 3 are advantageously filaments with a natural and/or latent crimp. Therefore, here continuous filaments in the form of bicomponent filaments with a side-by-side configuration are used.

In the embodiment according to FIG. 1, it is recommended that the one component (first side) should consist of polypropylene and the second component (second side) should consist of polyethylene with a weight ratio of polypropylene to polyethylene advantageously being 40:60 to 60:40. Here after depositing the second spunbond layer 3 on the first spunbond layer 2, the second upper spunbond layer 3 is preferably compacted and/or preconsolidated with the help of a hot air blade 5. Following this, the two-layer structure of the first lower spunbond layer 2 and the second upper spunbond layer 3 is preferably subjected to a final consolidation with the help of a calender 6. Here, the upper calendering roller 7 is preferably heated.

Figure 2:
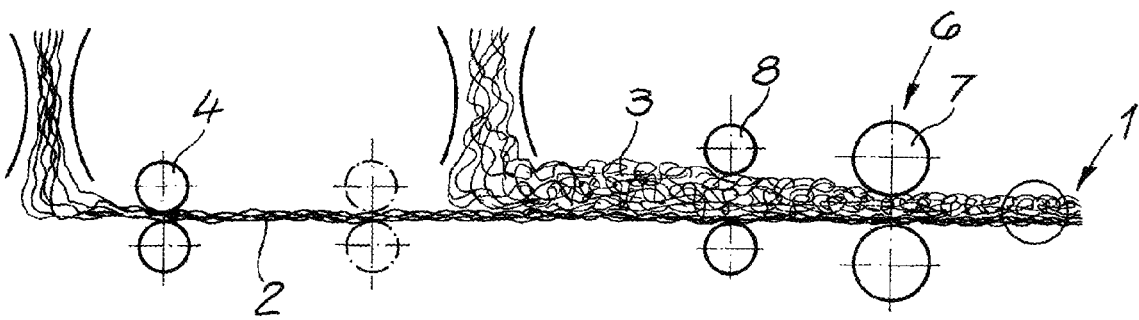
FIG. 2 shows a second embodiment of the subject matter as in FIG. 1.
Figure 2A:
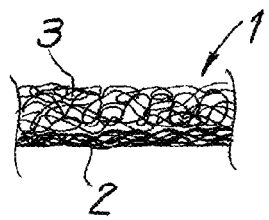
FIG. 2A is a large-scale view of a detail of FIG. 2.

In the embodiment according to FIG. 2, bicomponent filaments with a side-by-side configuration are also used for the second upper spunbond layer 3. The one component here (first side) consists of a first polypropylene and the second component (second side) consists of a second polypropylene that is different from the former. Here, after this second spunbond layer 3 has been deposited on the first spunbond layer 2, the second upper spunbond layer 3 is compacted and/or preconsolidated with the help of a second heated roller 8. In this embodiment, the temperature of the first heated roller 4 for compacting and/or preconsolidation of the first spunbond layer 2 is preferably higher than the temperature of the second heated roller 8 for compacting and/or preconsolidation of the second spunbond layer 3. It is recommended that in this embodiment the contact pressure of the first heated roller 4 should also be higher than the contact pressure of the second heated roller 8. In the embodiment according to FIG. 2, following the compacting and/or preconsolidation with the second heated roller 8, the two-layer structure of the first lower spunbond layer 2 and the second upper spunbond layer 3 is again subjected to a final consolidation with the help of a calender 6. The upper calendering roller 7 of the calender 6 is advantageously designed to be heated.

The method and/or the compacting/preconsolidation are preferably performed here such that the thickness $d_1$ of the first lower spunbond layer is 0.10 to 0.18 mm and the thickness $d_2$ of the second upper spunbond layer is 0.25 to 1.5 mm. Here, both the thickness and crimp of the spunbond layers 2 and 3 increase from the bottom to the top and/or from the lower spunbond layer 2 to the upper spunbond layer 3. A ratio of the thickness $d_1$ of the first lower spunbond layer 2 to the thickness $d_2$ of the second upper spunbond layer 3 in this embodiment preferably amounts to 1:1.2 to 1:3. According to the preferred embodiment, the titer of the continuous filaments of the first lower spunbond layer 2 is lower than the titer of the continuous filaments of the second upper spunbond layer 3. It is also within the scope of the invention for the spunbond layers 2 and 3 to be created and/or deposited such that the continuous filaments of the first lower spunbond layer 2 are oriented to a greater extent in the machine direction (MD) than the continuous filaments of the second upper spunbond layer 3. The lower, more compact spunbond layer 2 here is preferably stiffer and/or has a greater tensile strength in the machine direction than the second upper spunbond layer 3. The first lower spunbond layer 2 advantageously determines the strength and/or tensile strength and stiffness of the entire laminate 1 in the embodiment. However, the upper spunbond layer 3 also ensures the softness and voluminosity of the laminate 1.

We claim:
1. A method of making a laminate comprising the steps of:
a) making a first spunbond layer by the substeps of
a1) spinning non-crimping or low-crimping continuous first multi- or bi-component first filaments of symmetrical or coaxial configuration and having a titer of 1.0 to 2.5 den from a spinneret;
a2) cooling the spun first filaments in a cooling chamber;
a3) stretching the spun and cooled first filaments in a stretcher;
a4) passing the spun, cooled, and stretched first filaments through a diffuser;
a5) depositing the spun, cooled, and stretched first filaments downstream of the diffuser to form the first spunbond layer with a portion of the deposited first filaments extending in a machine direction; and
a6) preconsolidating the first spunbond layer at a predetermined first contact pressure with a first roller heated to a predetermined temperature;
b) making a second spunbond layer by the substeps of
b1) spinning continuous second filaments with a greater crimp than the continuous first filaments and having a titer of 1.8 to 2.5 den from a spinneret;
b2) cooling the spun second filaments in a cooling chamber;
b3) stretching the spun and cooled second filaments in a stretcher;
b4) passing the spun, cooled, and stretched second filaments through a diffuser; and
b5) depositing the spun, cooled, and stretched second filaments downstream of the diffuser to form the second spunbond layer;
c) applying the second spunbond layer over the preconsolidated first spunbond layer to create a two-layer structure with a smaller portion of the deposited second filaments extending in the machine direction than the portion of the first filaments extending in the machine direction, a filament diameter of the first filaments being smaller than a filament diameter of the second filaments;
d) preconsolidating the second spunbond layer at a second contact pressure smaller than the first contact pressure with a second calendering roller heated to a predetermined temperature lower than the predetermined temperature of the first roller; and
e) final-consolidating the two-layer structure into the laminate until
a total thickness of the laminate is 0.15 to 1.0 mm, and
a longitudinal stiffness of the laminate comprised of the first spunbond layer and the second spunbond layer is 20 to 80% of a longitudinal stiffness of a comparative nonwoven or laminate of the same grammage as and made of the filaments of the first spunbond layer.

2. The laminate-making method defined in claim 1, wherein the first continuous filaments of the first spunbond layer consist or essentially consist of polypropylene or polyethylene.

3. The laminate-making method defined in claim 1, wherein the second continuous filaments of the second spunbond layer have a natural or latent crimp.

4. The laminate-making method defined in claim 1, wherein the second continuous filaments of the second spunbond layer have an eccentric or asymmetrical core-sheath cross-sectional configuration.

5. The laminate-making method defined in claim 4, wherein the second continuous filaments of the second spunbond layer consist essentially of polyolefin.

6. The laminate-making method defined in claim 1 wherein the preconsolidation of the first spunbond layer at the first contact pressure is carried out such that the first spunbond layer has a thickness of 0.05 to 0.6 mm and the preconsolidation of the second spunbond layer at the second contact pressure is carried out such that the second spunbond layer has a thickness of 0.15 to 2.8 mm.

7. A laminate comprising:
a first spunbond layer essentially consisting of non-crimping or low-crimping continuous first multi- or bi-component filaments of symmetrical or coaxial configuration and having a titer of 1.0 to 2.5 den; and
a second spunbond layer atop the first spunbond layer, forming therewith a two-layer structure, and essentially consisting of continuous second filaments that have a titer of 1.8 to 2.5 den and are more strongly crimping than the continuous first filaments of the first spunbond layer, a filament diameter of the first filaments being smaller than a filament diameter of the second filaments, a total thickness of the two-layer structure being 0.15 mm to 1.0 mm, a weight of the laminate per unit of area being 8 to 80 g/m², a larger portion of the first filaments being oriented in a machine direction than of the second filaments, a ratio of a thickness of the first spunbond layer to a thickness of the second spunbond layer is 1.0:0.8 to 1.0:6.0, and a longitudinal stiffness of the laminate comprised of the first spunbond layer and the second spunbond layer is 20 to 80% of a longitudinal stiffness of a comparable nonwoven or laminate of the same grammage as and made of the filaments of the first spunbond.

8. The laminate defined in claim 7, wherein a weight of the first spunbond layer per unit of area amounts to 31 to 70% of a total weight of the laminate.

9. The method defined in claim 1, wherein the total thickness is at most 0.8 mm.

* * * * *